United States Patent
Price, Jr.

(10) Patent No.: US 7,154,693 B2
(45) Date of Patent: Dec. 26, 2006

(54) PROGRAMMABLE OVERSHOOT FOR A SERVO WRITER

(75) Inventor: John J. Price, Jr., Eagan, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/977,412

(22) Filed: Oct. 29, 2004

(65) Prior Publication Data
US 2005/0111126 A1  May 26, 2005

Related U.S. Application Data

(63) Continuation-in-part of application No. 10/118,782, filed on Apr. 9, 2002, now Pat. No. 6,721,115.

(51) Int. Cl.
*G11B 5/02* (2006.01)

(52) U.S. Cl. .................................. 360/68; 327/110

(58) Field of Classification Search ............. None
See application file for complete search history.

(56) References Cited

U.S. PATENT DOCUMENTS

| | | | | |
|---|---|---|---|---|
| 6,297,921 | B1* | 10/2001 | Price et al. | 360/68 |
| 6,366,421 | B1* | 4/2002 | Teterud | 360/68 |
| 6,870,697 | B1* | 3/2005 | Ikekame et al. | 360/46 |
| 6,967,797 | B1* | 11/2005 | Sako | 360/46 |

* cited by examiner

*Primary Examiner*—Andrea Wellington
*Assistant Examiner*—Dan I Davidson
(74) *Attorney, Agent, or Firm*—Warren L. Franz; W. James Brady, III; Frederick J. Telecky, Jr.

(57) ABSTRACT

A HDD write driver circuit (10) having a boost current overshoot programmed by a plurality of pull-up devices (MP35, MP36, MP39, MP45). The pull-up strength of an inverter (20) is adjustably selected by programming pull-up PMOS devices, and less power is dropped across a resistor (R41) such that there is less boost current overshoot when an overshoot MSB is low.

12 Claims, 6 Drawing Sheets

PROGRAMMABLE OVERSHOOT FOR A SERVO WRITER

CROSS REFERENCE TO RELATED APPLICATIONS

This application is a continuation-in-part of commonly assigned U.S. patent application Ser. No. 10/118,782 filed Apr. 9, 2002 now U.S. Pat. No. 6,721,115, entitled "System and Method for Enhancing Write Driver Performance".

FIELD OF THE INVENTION

The present invention is generally related to hard disk drives (HDDs), and more particularly to HDD write drivers.

BACKGROUND OF THE INVENTION

In the process of manufacturing hard disk drives (HDD) the servo track data must be written to the disk surfaces. In order to speed up this process, manufacturers commonly write more than one disk surface at a time, and up to the total number of surfaces (up to eight) at the same time. The preamps must have the ability to enter the Servo Write mode to enable writing to several heads simultaneously. Write drivers typically dissipate a lot of power due to the high-speed and high-current writing requirements of today's HDDs. It is not practical to turn on eight of these power-hungry writers at the same time. Since servo writing is done at a much lower data rate (such as less than 500 Mb/s) than normal data writing (such as 1.5 Gb/s), an approach to accommodate simultaneous writing of many surfaces has been to incorporate a lower performance and lower power write driver with each head which operates only during Servo Write mode. The object of these servo writers is to dissipate as little power as possible and to consume as little silicon area as possible.

SUMMARY OF THE INVENTION

The present invention achieves technical advantages as a HDD write driver circuit having a boost current overshoot programmed by a plurality of pull-up devices. The pull-up strength of an inverter is adjustably selected by programming pull-up PMOS devices, and less power is dropped across a resistor such that there is less overshoot when an overshoot MSB is low.

DETAILED DESCRIPTION OF THE PREFERRED EMBODIMENT

Referring to FIG. 1, there is shown a first embodiment of a servo writer circuit at 10 including a resistor R41 connected directly to VEE. Advantageously, programmable overshoot is accomplished by programming a plurality of parallel pull-up PMOS devices pulling up an inverter 20, which inverter 20 drives a capacitor C19. These PMOS devices can be seen in the first preferred embodiment in FIG. 1 as MP39, MP36, MP44 and MP35, the first three devices of which are connected to the decoded two LSBs of the overshoot programming bits. As these bits are varied, the pull-up strength of the inverter 20 is varied to correspondingly vary the current supplied to capacitor C19, which drives transistor Q16 to pull down varying amounts of boost current at the pre-driver node.

Figure 1A:
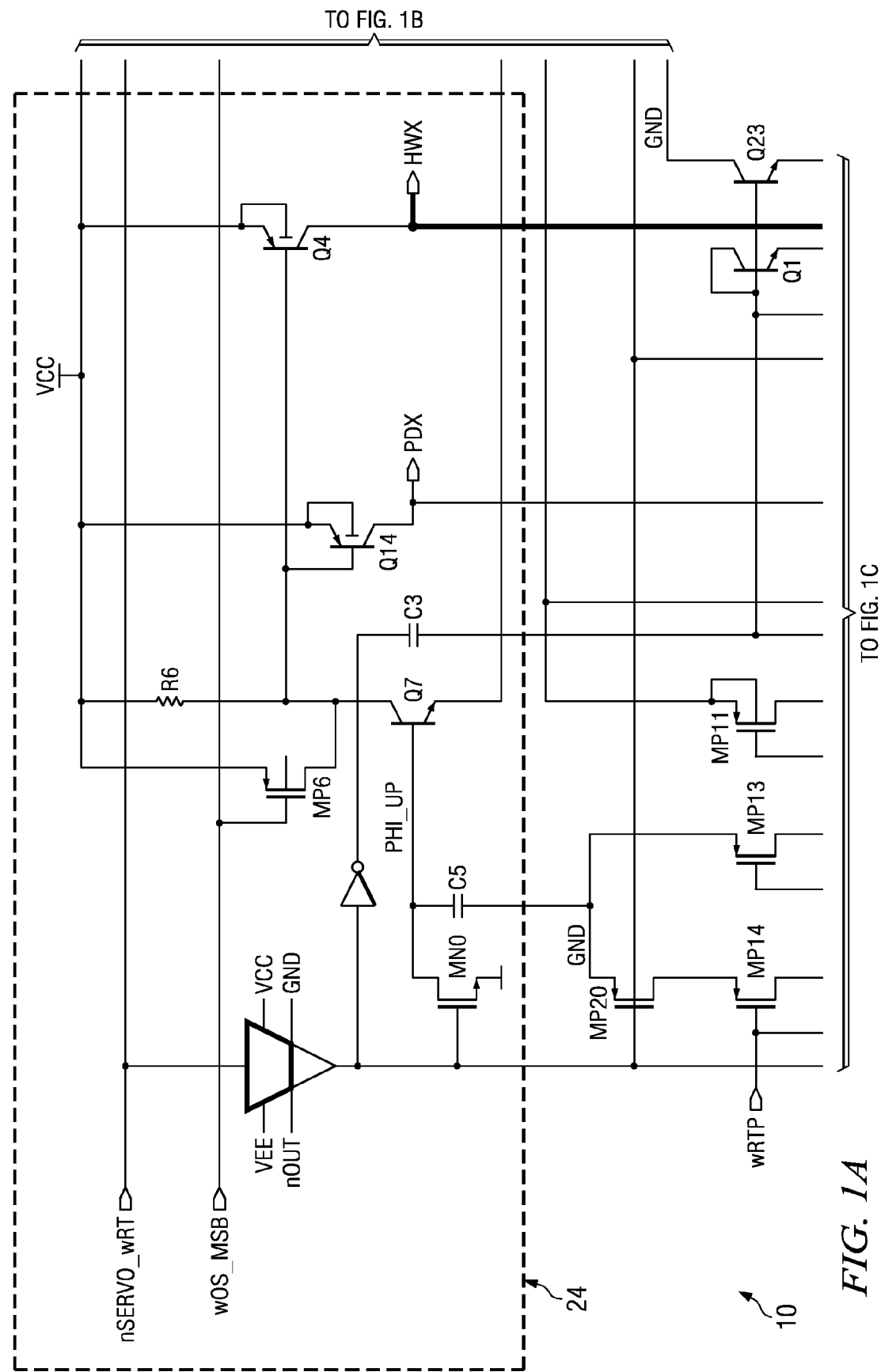
FIG. 1 is a schematic diagram of a programmable overshoot circuit which can be used in the circuit of FIG. 1 according to one embodiment of the invention.
Figure 1B:
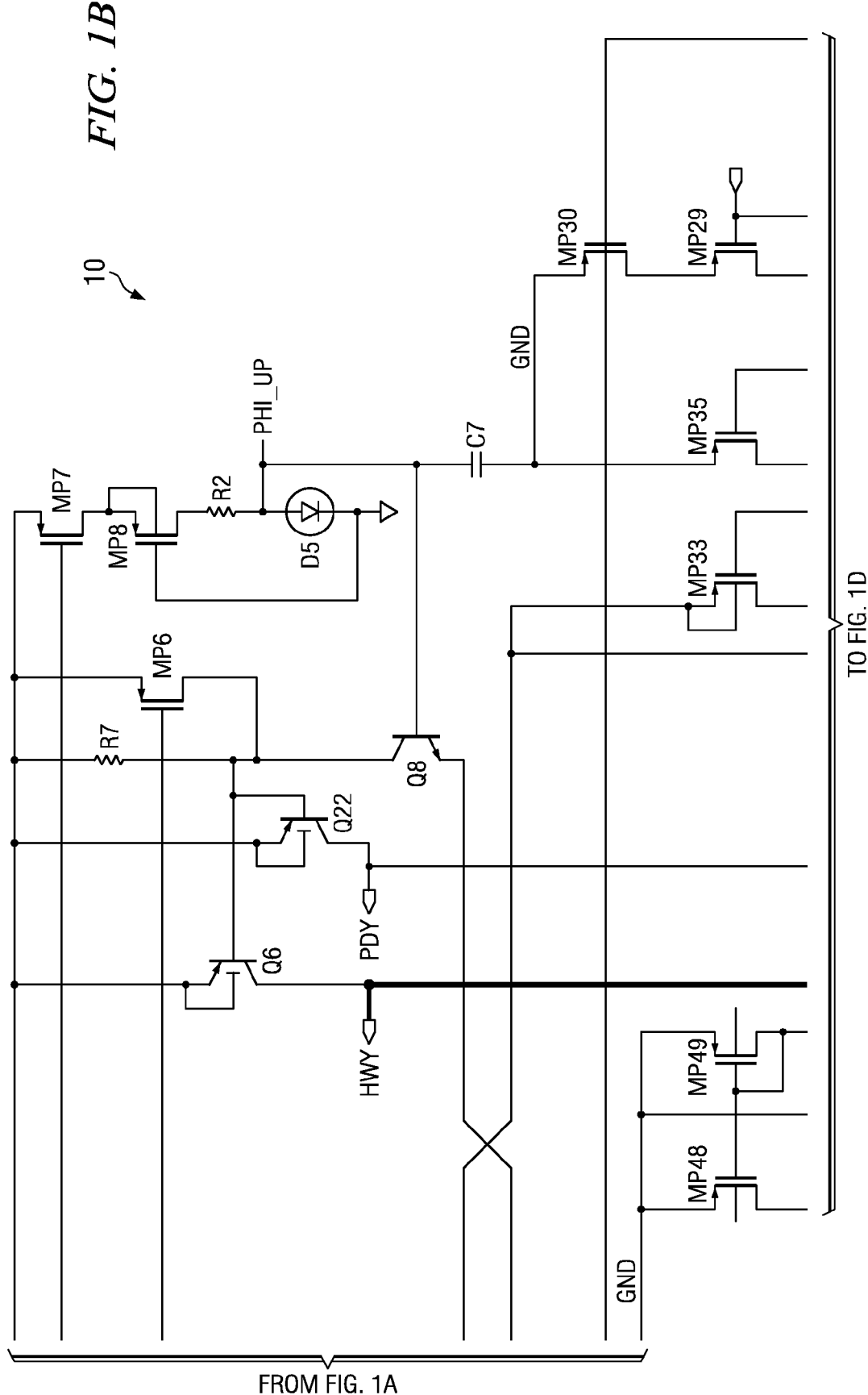
Figure 1C:
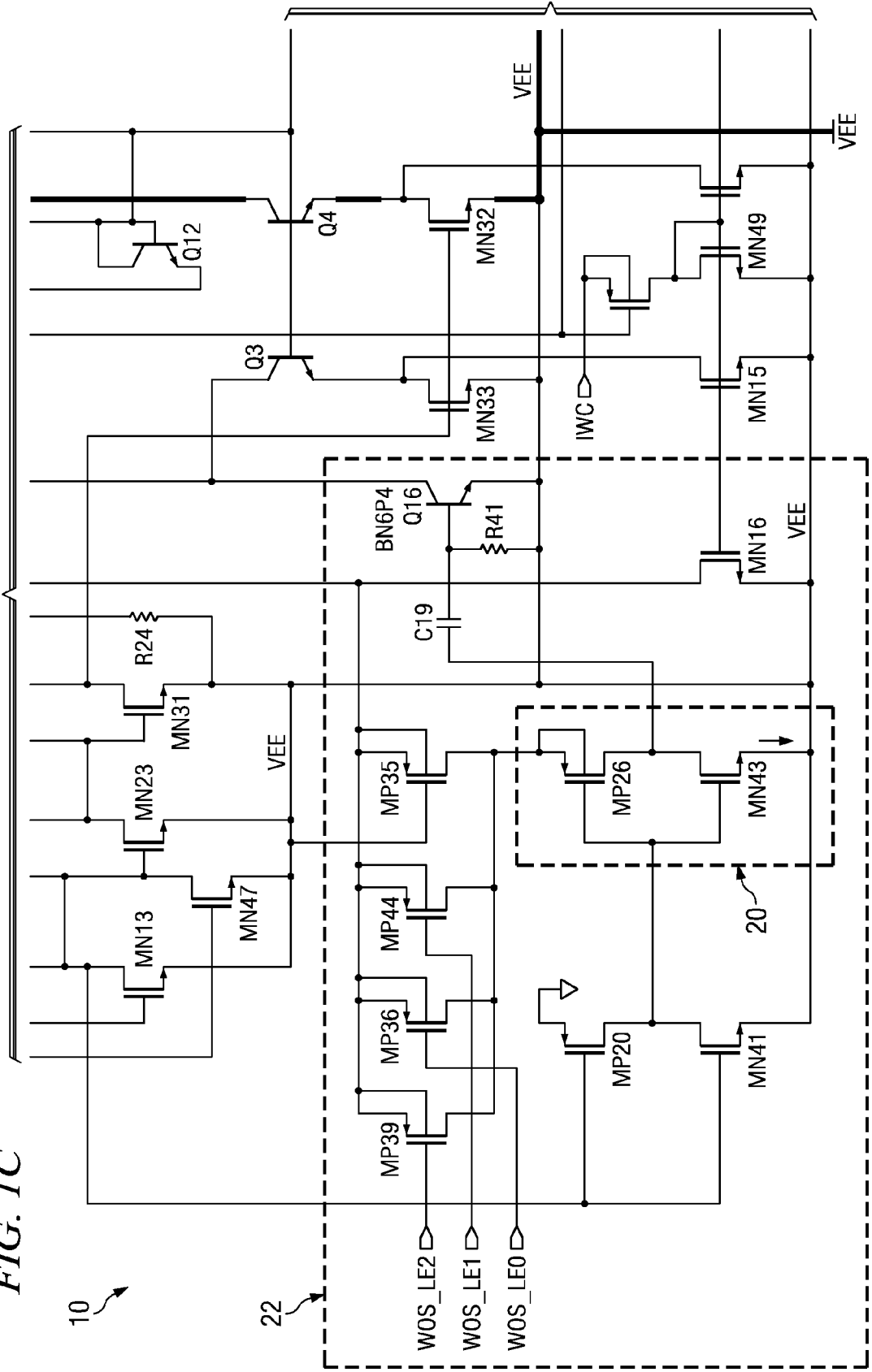
Figure 1D:
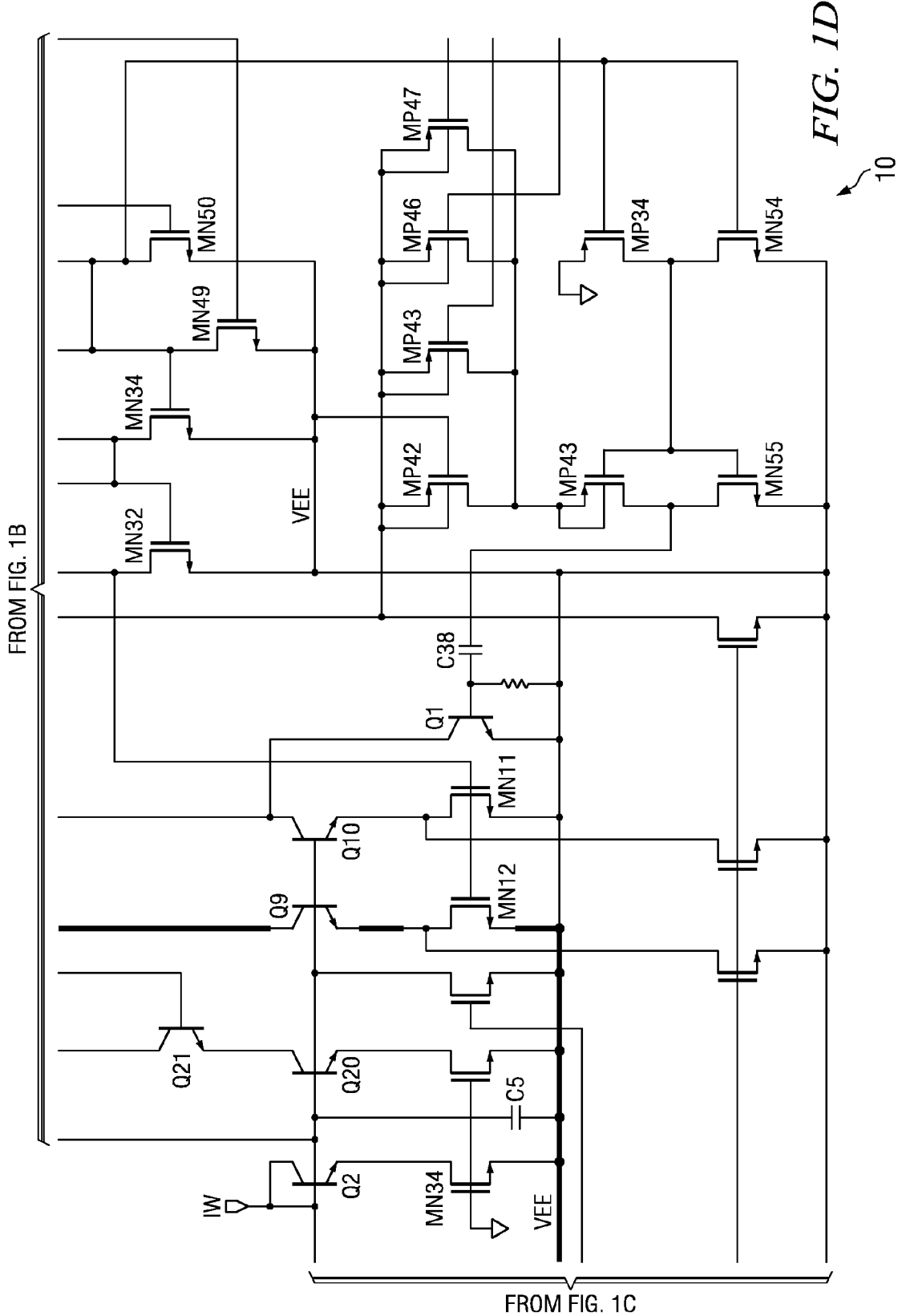
Figure 2:
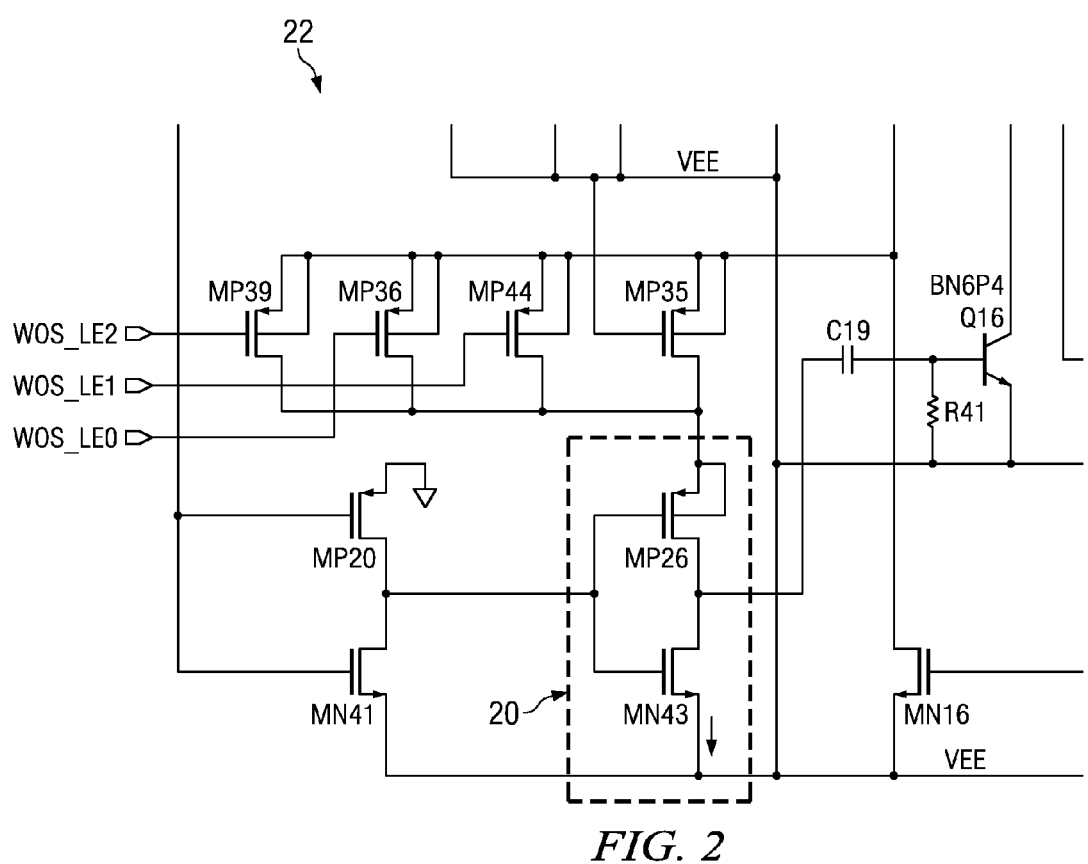
FIG. 2 is a enlarged schematic of that portion of circuit 10 having the programmable pull-up devices.

FIG. 2 shows a close-up of a portion 22 of circuit 10 of the devices programming the overshoot current, namely, transistors MP35, MP36, MP39 and MP44. Current from the other side's inverters enters at cascode transistor Q7's emitter (FIG. 1). In this embodiment of the invention, this current of transistor Q7 is used to power on two PNP transistors, transistor Q14 which provides boost pull-up current to the pre-drive node, and transistor Q4 which provides boost pull-up current directly to the writer output pin. The current flowing through transistor Q7 goes to resistor R6 (90 Ohms), and to the bases of transistors Q14 and Q4. PMOSFET MP6 is in parallel with resistor R6 and reduces its resistance when the MSB is low. Thus, less voltage is dropped across the resistor R6 and less current is available for transistors Q14 and Q4, thus producing less overshoot when the MSB is low. By appropriately sizing transistors MP39, MP36, MP44, MP35 and MP6 the overshoot can be programmed over the desired range with even step sizes.

Figure 3:
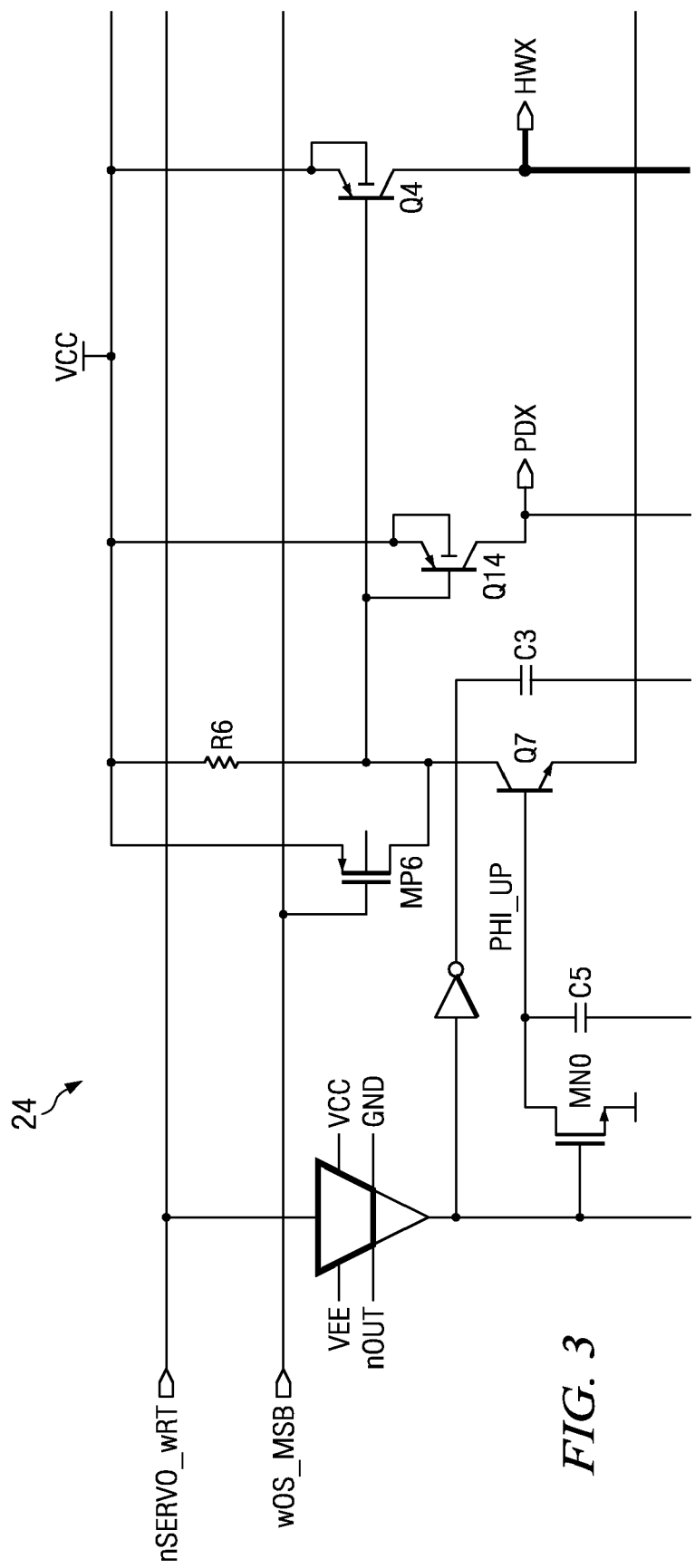
FIG. 3 is an enlarged schematic diagram of a portion of the circuit 10 programming the MSB of the circuit.

FIG. 3 shows a close-up portion 24 of circuit 10 showing the MSB of the overshoot programming circuitry.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A programmable HDD write driver circuit, comprising:
   an H-bridge;
   a write current boost circuit coupled to the H-bridge and providing a boost current during a transition of the H-bridge, and comprising a plurality of programming transistors adapted to be selectively enabled to responsively program an overshoot of the boost current;
   wherein the programming transistors are coupled to a common node;
   wherein the write current boost circuit comprises at least one inverter coupled to the common node; and
   wherein the inverter is coupled via the programming transistors to a voltage, the programming transistors establishing a pull-up strength of the inverter.

2. The HDD write driver circuit as specified in claim 1 wherein the inverter has an output driving a boosting transistor.

3. The HDD write driver circuit as specified in claim 2 further comprising a capacitor disposed between the inverter output and the boosting transistor.

4. The HDD write driver circuit as specified in claim 3 wherein a node between the capacitor and the boosting transistor is coupled to one end of a resistor.

5. The HDD write driver circuit as specified in claim 4 wherein an opposing end of the resistor is coupled to a voltage reference.

6. The HDD write driver circuit as specified in claim 5 wherein the voltage reference is a negative supply.

7. The HDD write driver circuit as specified in claim 4 wherein the boosting transistor is a pre-driver transistor.

8. The HDD write driver circuit as specified in claim 1 wherein the programming transistors are controlled by at least two control lines, which are related to programming bits.

9. The HDD write driver circuit as specified in claim 8 wherein one control line is controlled by a MSB.

10. The HDD write driver circuit as specified in claim 1 wherein the H-bridge further comprises a left side and a right side, each said side of the H-bridge having one said inverter, each of the inverters receiving a supply current from the other side of the H-bridge.

11. The HDD write driver circuit as specified in claim 10 wherein an effect of each of the supply currents on the other side of the H-bridge is established by at least one control line.

12. The HDD write driver circuit as specified in claim 11 wherein the control line is a MSB.

* * * * *